United States Patent
Xiao et al.

(10) Patent No.: US 7,991,229 B2
(45) Date of Patent: Aug. 2, 2011

(54) REDUCING COMPRESSION ARTIFACTS IN MULTI-LAYER IMAGES

(75) Inventors: Jing Xiao, Cupertino, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 1002 days.

(21) Appl. No.: 11/846,343

(22) Filed: Aug. 28, 2007

(65) Prior Publication Data

US 2009/0060354 A1 Mar. 5, 2009

(51) Int. Cl.
*G06K 9/34* (2006.01)
*G06K 9/46* (2006.01)
*G06K 9/42* (2006.01)

(52) U.S. Cl. .................... 382/176; 382/232; 382/257

(58) Field of Classification Search .................. 382/176
See application file for complete search history.

(56) References Cited

U.S. PATENT DOCUMENTS

| | | | | |
|---|---|---|---|---|
| 5,231,580 A * | 7/1993 | Cheung et al. | ................ | 382/128 |
| 5,778,092 A * | 7/1998 | MacLeod et al. | ............ | 382/176 |
| 6,026,183 A * | 2/2000 | Talluri et al. | ................... | 382/194 |
| 6,115,140 A * | 9/2000 | Bresler et al. | .................. | 358/1.9 |
| 6,275,304 B1 * | 8/2001 | Eschbach et al. | ............. | 358/1.9 |
| 6,832,007 B1 * | 12/2004 | Zhang et al. | .................. | 382/257 |
| 7,120,297 B2 | 10/2006 | Simard et al. | | |
| 7,139,437 B2 | 11/2006 | Jones et al. | | |
| 2003/0072489 A1 * | 4/2003 | Reichenbach et al. | ........ | 382/181 |
| 2003/0133612 A1 | 7/2003 | Fan | | |
| 2004/0001625 A1 * | 1/2004 | Curry et al. | .................... | 382/173 |
| 2005/0193311 A1 * | 9/2005 | Das et al. | ...................... | 714/753 |
| 2006/0045346 A1 * | 3/2006 | Zhou | ............................. | 382/190 |
| 2007/0071300 A1 * | 3/2007 | Ching | ........................... | 382/129 |

* cited by examiner

*Primary Examiner* — David P Zarka (57) ABSTRACT

Disclosed are embodiments of systems, devices, and methods to reduce compression artifacts in multi-layer images. Pixel dilation operations, such as morphological dilations, are performed to identify unlabeled pixels at boundaries between layers, and the colors of those pixels are adjusted to mitigate formation of artifacts during layer compression.

20 Claims, 9 Drawing Sheets

500 orEd

ーション対応カラー液晶モニ

1024) 表示可能、

505 orEd

ーション対応カラー液晶モニ

1024) 表示可能、

510 orEd

REDUCING COMPRESSION ARTIFACTS IN MULTI-LAYER IMAGES

BACKGROUND

A. Technical Field

The present invention pertains generally to image processing, and relates more particularly to image processing that reduces compression artifacts in multi-layer images.

B. Background of the Invention

Applications that render, record, or display images with limited resources often employ multi-layer compression. In such applications, an input image is first segmented into two or more layers, each of which refers to one type of distinctive characteristic of the input image. These layers and their associated masks are then compressed independently. An advantage of independent compression is that layers containing important information can be preserved while the other layers can undergo more aggressive compression. The set of layers and their associated masks then can form a highly compressed format that retains high information quality.

Segmentation of an input image often results in imprecise definition of the boundary between the foreground layer and the non-foreground layers. This may result in incomplete labeling of the foreground pixels and thus some foreground pixels at the boundary may be labeled non-foreground. These unlabeled foreground pixels may have very different colors than their neighboring non-foreground pixels, and the color differences may lead to strong artifacts in the non-foreground layers after compression. These artifacts will then appear in the images generated from the compressed layers.

SUMMARY OF THE INVENTION

Aspects of the present invention provide systems, devices and methods for reducing compression artifacts in multi-layer images. Applications that render, record, or display images with limited resources often employ multi-layer compression. In such applications, an input image is first segmented into two or more layers, each of which refers to one type of distinctive characteristic of the input image. These layers and their associated masks can be compressed independently; an output image then can be rendered, recorded, or displayed using the compressed layers and their associated masks, which use much less resources than the original image data.

Segmentation of an input image often results in incomplete definition of the boundary between the foreground layer, containing the most important image characteristics, and the non-foreground layers. This results in some of the foreground pixels at the boundary being labeled non-foreground. These unlabeled foreground pixels may have very different colors than their neighboring non-foreground pixels, and the color differences may lead to artifacts in the non-foreground layers after compression Various embodiments of the present invention apply a morphological dilation operation to the foreground mask in order to identify unlabeled foreground pixels in the background layer. The colors of these unlabeled foreground pixels are adjusted so that they smoothly integrate with the colors of the neighboring non-foreground pixels in the background layer. The adjustment of the background layer mitigates the formation of artifacts during background layer compression.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

Presented herein are systems and methods to reduce compression artifacts in multi-layer images. The present approach uses a morphological dilation operation applied to the foreground label mask in order to enhance the boundary transition area and facilitate identification of foreground pixels that may not have been labeled as foreground after segmentation ("transition pixels"). The colors of the transition pixels then can be smoothly averaged with their neighboring pixel colors in a background (non-foreground) layer prior to compression of the background layer.

For purposes of illustration, the present invention will demonstrate reduction of compression artifacts using an example of 2-layer PDF generation from document images. It should be noted that the present invention can be applied to other types of multi-layer images and image processing applications, including but not limited to document processing.

In various embodiments, a 2-layer PDF may be generated from document images. One of the layers is the foreground layer that contains the important information that should be preserved, such as the text pixels or sharp edges. The other layer is the background layer that contains all of the other pixels ("non-foreground pixels"). A binary mask image of the foreground labels relates the two layers so that the image may be rebuilt. After segmentation, the boundaries between the foreground and background areas may not be absolute. Instead, there may be a transition area at the boundary in which some foreground pixels are not given foreground labels. These unlabeled pixels may often have very different color from their neighboring background pixels. These large color differences may lead to strong artifacts in the background layer after compression.

A. System Implementations

Figure 1:
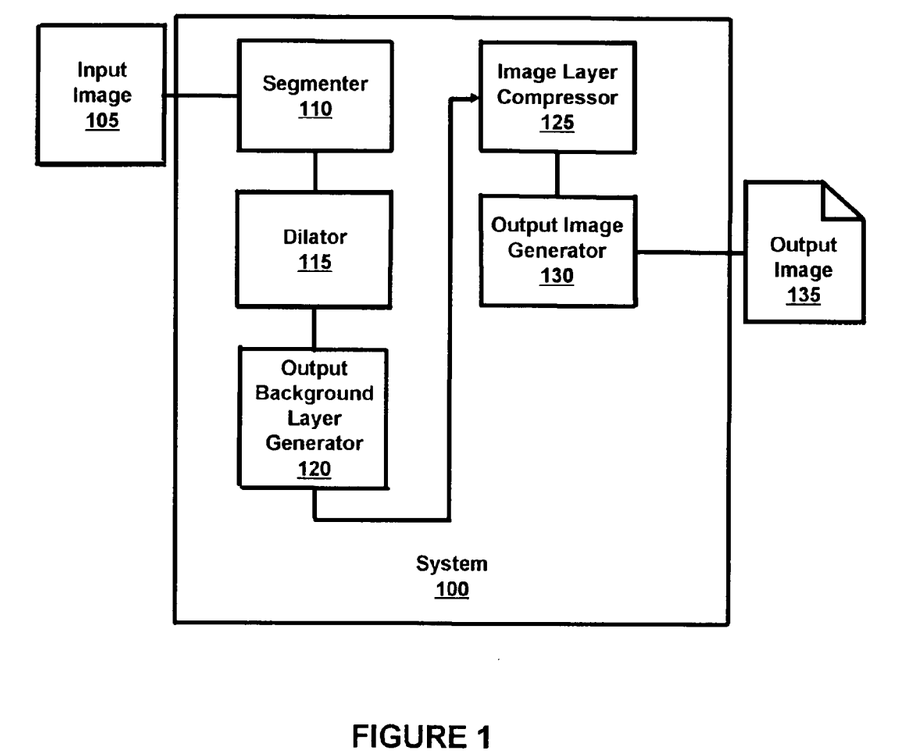
FIG. 1 depicts a system for reducing compression artifacts in multi-layer images according to various embodiments of the invention.

FIG. 1 depicts a system 100 for reducing compression artifacts in multi-layer images according to various embodiments of the invention. System 100 comprises a segmenter 110, dilator 115, output background layer generator 120, image layer compressor 125, and output image generator 130.

In various embodiments, segmenter 110 receives an input image and segments the image into a plurality of layers including a layer with foreground pixel regions and at least one layer with non-foreground pixel regions. In various embodiments, segmenter 110 may generate a binary foreground label mask from the layer with foreground pixel regions, but in alternative embodiments this may be done in a separate module. Segmenter 110 may perform one or more segmentation methods. One skilled in the art will recognize that numerous different segmentation methods may be used within the scope and spirit of the present invention.

In various embodiments, the binary foreground label mask may be provided to dilator 115 which applies a morphological dilation operation to the foreground pixels in the binary foreground label mask in order to generate a dilated foreground label mask. A morphological dilation operation is the application of a geometric array of pixels (a "dilation object") to pixels in an image in order to enhance an image feature. An example morphological dilation operation is the application of a dilation object that is a circle with a 2 pixel radius to foreground pixels in the foreground label mask. One skilled in the art will recognize that various types and sizes of dilation objects may be used in a morphological dilation operation. In alternative embodiments, adaptive morphological dilation may be used. In this case, the type and size of a dilation object may be changed dynamically as the dilation operation is being applied to the pixels.

In various embodiments, a dilated foreground label mask, a foreground label mask, and at least one of a plurality of non-foreground layers are received by output background layer generator 120, which combines them to generate an output background layer. Generation of an output background layer may include assignment of colors to the pixels in the output background layer. The output background layer pixels labeled "true background" pixels (non-foreground pixels) may be assigned colors copied from the corresponding non-foreground layers and the output background layer pixels labeled "true foreground" pixels (foreground pixels) may be assigned colors copied either from the closest true background pixels, or from the average of the colors of neighboring true background pixels within a certain distance (e.g. 5 pixels), or from using methods known to those skilled in the art. For example, U.S. patent application Ser. No. 11/691,339, entitled "Systems and Methods for Generating Background and Foreground Images for Document Compression," filed Mar. 26, 2007, which is herein incorporated by reference in its entirety, discloses one such method of color assignment to pixels. This step ensures that the true foreground pixels have colors consistent with the neighboring true background pixels so that later compression processing on the background image layer achieves optimal performance. According to a method described as part of this invention, the output background layer pixels labeled "dilated foreground pixels" may be assigned colors that are adjusted from neighboring pixels that have been assigned colors.

In various embodiments, image layer compressor 125 receives a foreground layer, a foreground label mask, and an output background layer that were generated from an input image. Each of the layers and the mask may be compressed separately. One skilled in the art will recognize that any compression method may be used for any of the layers or mask.

In various embodiments, output image generator 130 receives a compressed foreground layer, a compressed foreground label mask, and a compressed output background layer. Output image generator 130 generates an output image using the compressed layers and mask. Methods known in the art may be used to generate the output image.

Figure 2:
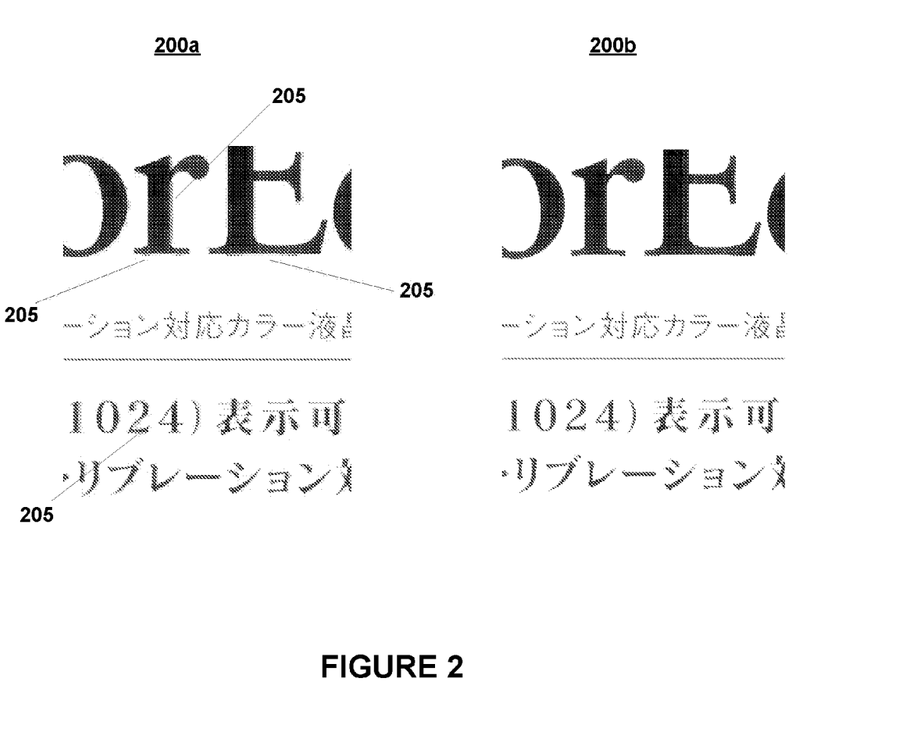
FIG. 2 illustrates an example of reduction of compression artifacts in a multi-layer document after processing according to various embodiments of the invention.

FIG. 2 depicts enlarged regions of an output image 200 that has been generated from a compressed multi-layer input image. Image 200a has been generated using an approach currently known in the art. Image 200a contains several compression artifacts 205, some of which have been marked. Image 200b has been generated using the approach in the present invention, and exhibits a reduction in the number and severity of compression artifacts.

B. Method for Reducing Compression Artifacts in Multi-Layer Images

Figure 3:
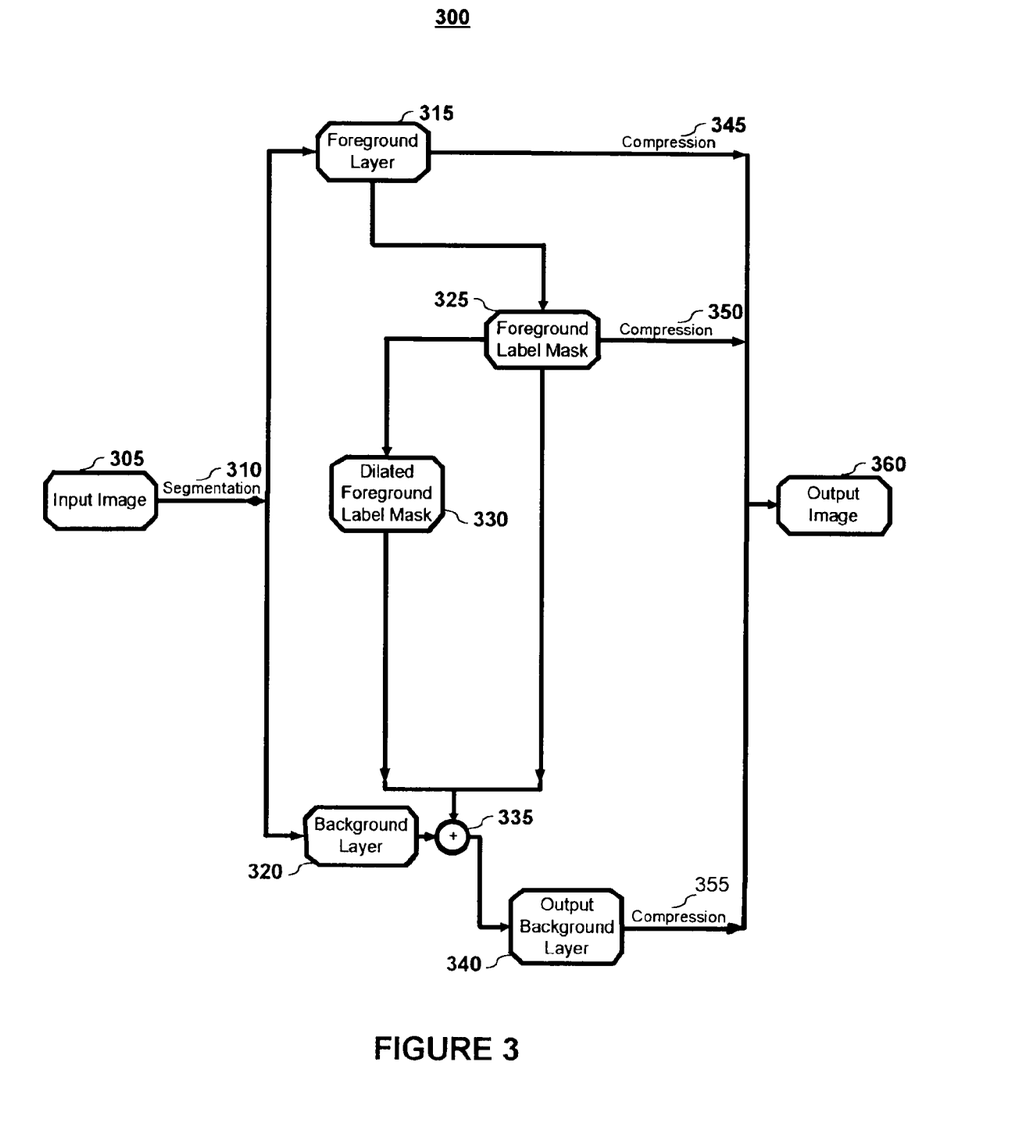
FIG. 3 illustrates a method for reducing compression artifacts in a multi-layer image according to various embodiments of the invention.

FIG. 3 depicts a method, independent of structure, to reduce compression artifacts in a multi-layer image according to various embodiments of the invention. An input image 305 is segmented 310 into two layers: a foreground layer 315 that contains foreground pixels; and a background layer 320 that contains non-foreground pixels. In various embodiments, a PDF document input image 305 may be segmented into two layers: a foreground layer 315 containing important information such as text pixels or sharp edges; and a background layer 320 that contains all of the other pixels. A binary foreground label mask 325 is generated from the foreground layer 315.

An output image 360 may be generated from a compressed foreground layer 315, a compressed background layer 320, and a compressed foreground label mask 325. The output image 360 may contain compression artifacts because, after an input image 305 is segmented into layers, the boundaries between the foreground layer and the background layer may not be absolute and all of the foreground pixels may not have been labeled. The unlabeled foreground pixels in the background layer ("transition pixels") may have different colors from their neighboring background pixels. These color differences may result in compression artifacts that appear in the output image 360.

To mitigate the color differences, the present invention describes a method to identify more of the transition pixels and thus be able to adjust and smooth colors of the transition pixels. In alternative embodiments, this method may be applied to grayscale images. In various embodiments, a morphological dilation operation may be applied to the foreground pixels in the foreground label mask to generate a dilated foreground label mask 330 that has an expanded foreground. The pixels in the expanded foreground are "dilated foreground pixels."

In various embodiments, a foreground label mask 325, a dilated foreground label mask 330, and a background layer 320 may be combined 335 to generate an "output background layer" 340 in which the colors of the dilated foreground pixels are adjusted to the colors belonging to their neighboring pixels.

One skilled in the art will recognize that many compression methods (345, 350, and 355) may be used to compress a foreground layer 315, a foreground label mask 325, and an output background layer 340. Compressing the output background layer 340 instead of the background layer 320 and using that compressed layer in the generation of an output image 360 may result in a reduction of compression artifacts in the output image 360.

Figure 4:
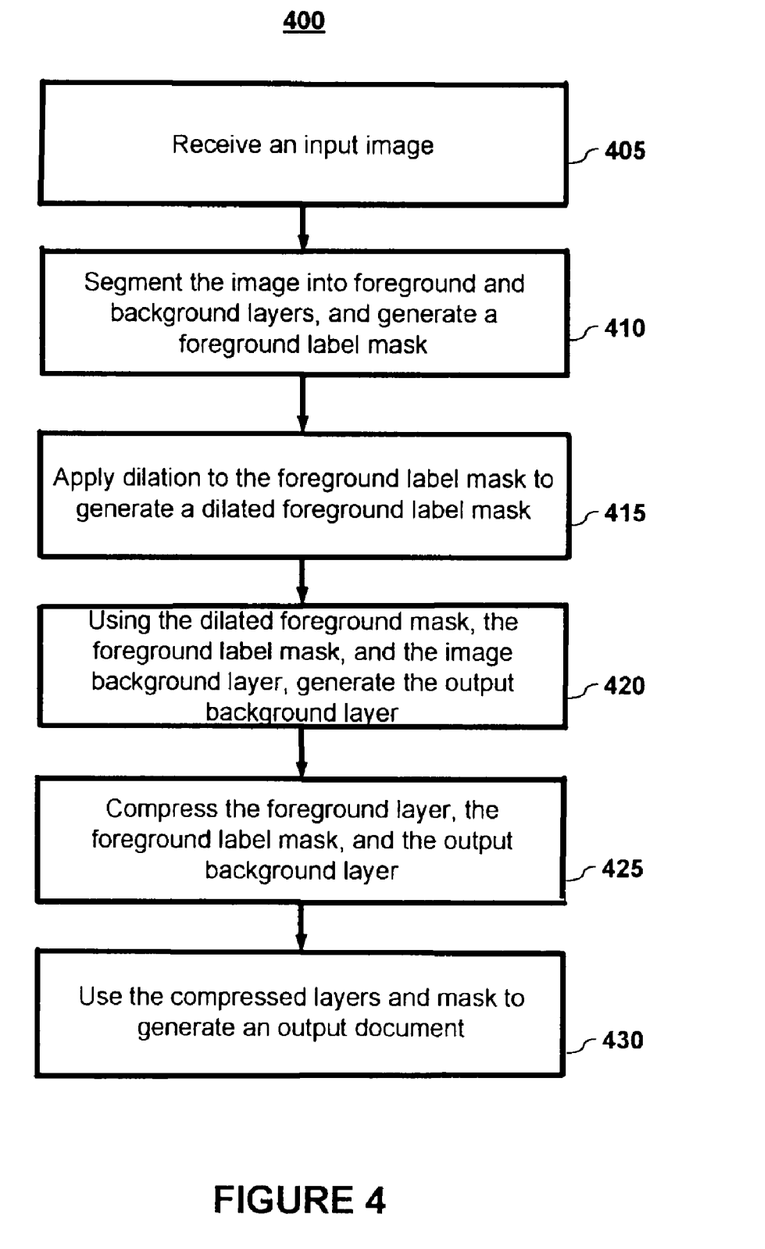
FIG. 4 depicts a method for reducing compression artifacts in a resulting multi-layer image according to various embodiments of the invention.

FIG. 4 depicts various embodiments of a method 400, independent of structure, to reduce compression artifacts in multi-layer images by applying morphological dilation to the foreground label mask in order to identify boundary transition pixels, and then using that information to generate a background layer in which the boundary colors have been smoothed.

1. Method for Identification of Boundary Transition Pixels

Figure 5:
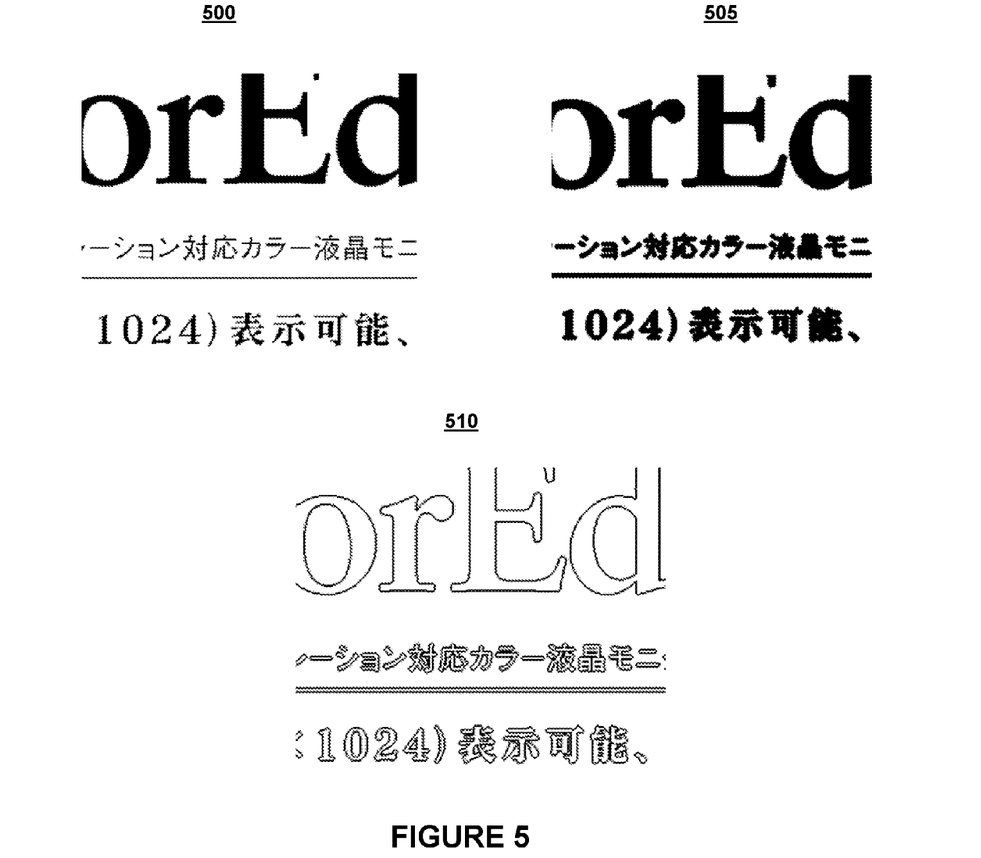
FIG. 5 illustrates an example of a foreground label mask, a dilated foreground label mask, and a background with dilated foreground label pixels according to various embodiments of the invention.

In various embodiments of method 400, a binary foreground label mask 325 will be generated at the completion of step 410. The foreground labels in this mask may not cover the entire boundary between the foreground and non-foreground areas so that some foreground pixels are not labeled. In step 415, a morphological dilation operation is applied to the foreground pixels in the foreground label mask. The result of this step is the generation of a dilated foreground mask. FIG. 5 depicts an example 505 of the dilated foreground mask 330 that is generated from the application of morphological dilation ("dilation") to an example 500 of a binary foreground label mask 325 according to an embodiment. In examples 500 and 505, foreground pixels are colored black.

Figure 6:
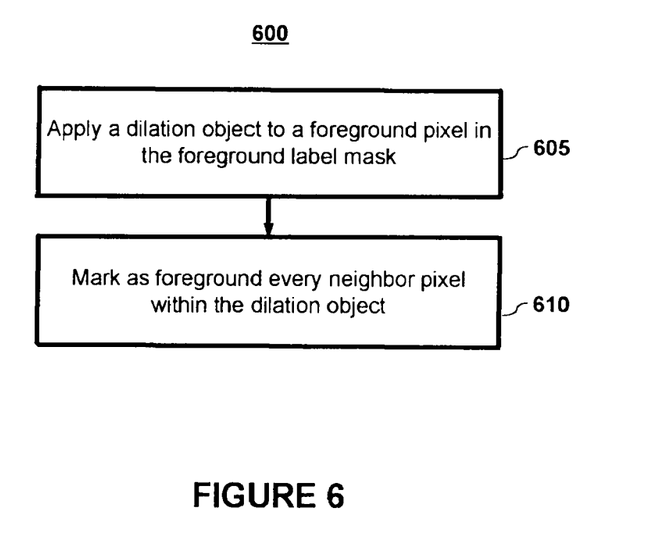
FIG. 6 depicts a method for pixel dilation according to various embodiments of the invention.

FIG. 6 depicts various embodiments of a method 600, independent of structure, to apply dilation to a foreground label mask 325 in order to generate a dilated foreground mask 330. In step 605, a geometric pattern of pixels ("dilation object") is defined. This dilation object may be a circle with a radius of 2 pixels although one skilled in the art will recognize that a dilation object may be defined in many shapes and sizes. In step 610, the dilation object is applied to each foreground pixel in the foreground label mask. Each foreground pixel is placed at the origin of the dilation object (for example, the center of a circle with a radius of 2 pixels) and all neighboring pixels covered by the dilation object may be marked as foreground. In alternative embodiments, each foreground pixel may be assigned another position within the dilation object (for example, a corner of a grid). In alternative embodiments, neighboring pixels that are covered by the dilation object may be assigned labels based on characteristics of the dilation object or on other algorithms known by a person skilled in the art. In alternative embodiments, "adaptive dilation" may be applied to the pixels in the foreground label mask so that the size and shape of the dilation object as well as how neighboring pixels are labeled may change dynamically as dilation is applied to each foreground pixel in the mask.

2. Method for Adjusting Colors of Dilated Foreground Pixels

In various embodiments of step 420 of method 400, an "output background layer" 340 may be generated by combining (335) a foreground label mask 325, a dilated foreground label mask 330, and a background layer 320. The pixels in the output background layer may be labeled "true foreground pixels" if they came from a foreground label mask 325, "dilated foreground pixels" if they came from a dilated foreground label mask 330, and "true background pixels" if they came from a background layer 320 and were not dilated foreground pixels. An example 510 of dilated foreground pixels in an output background layer according to one embodiment is depicted in FIG. 5, in which only the dilated foreground pixels are colored black.

Figure 7:
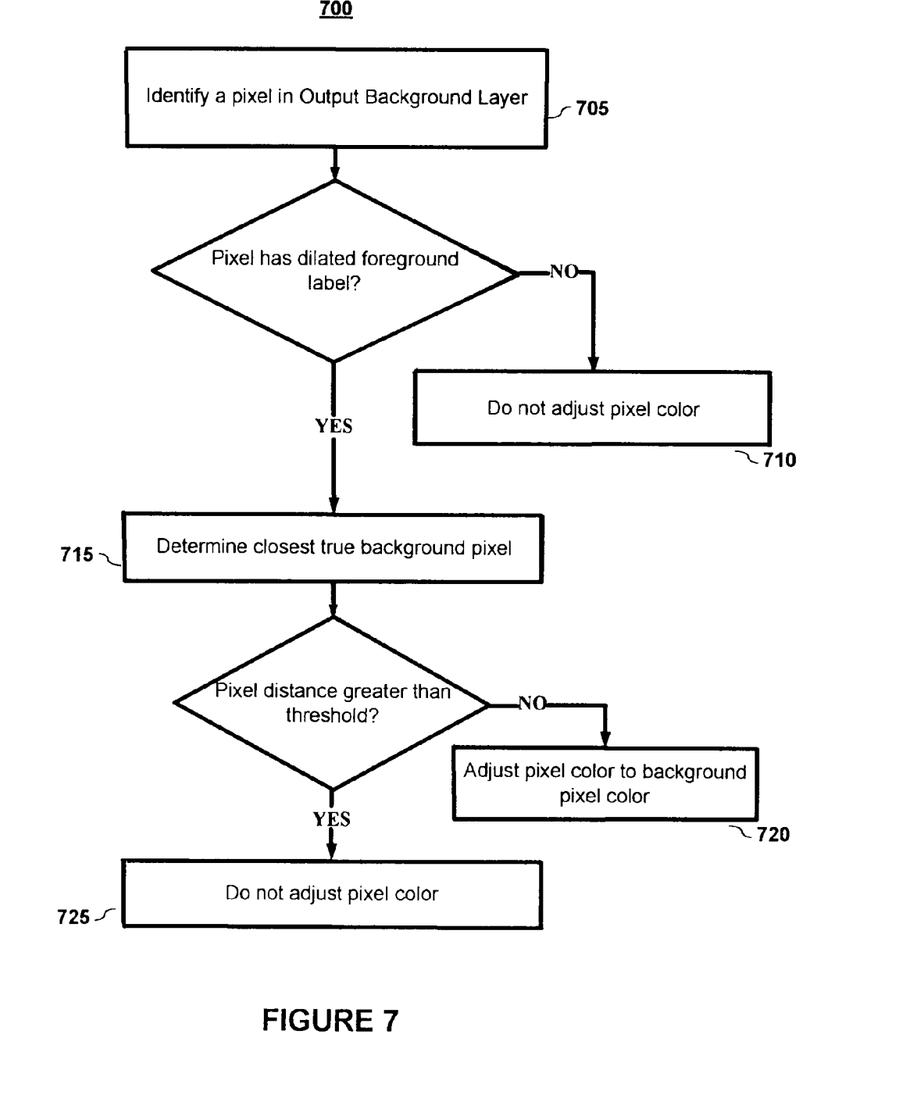
FIG. 7 depicts a method for adjusting pixel colors in the output background layer according to various embodiments of the invention.

In various embodiments, the dilated foreground pixels represent a transition zone between the true foreground pixels and the true background pixels. FIG. 7 depicts various embodiments of method 700, independent of structure, for adjusting the colors of the dilated foreground pixels within the output background layer in order to smooth the transition at the boundary between the foreground and background layers in an image. The smoother transition may result in reduction of compression artifacts in generated output images created from multiple layers, according to the present invention. Method 700 is applied to each pixel in the output background layer.

In various embodiments of step 705 of method 700, the colors assigned to the true foreground pixels and true background pixels are copied from the background layer 320. The colors assigned to the true foreground pixels are copied from the closest true background pixels, or from the average of the colors of neighboring true background pixels within a certain distance (e.g. 5 pixels), or from using methods known to those skilled in the art such as the method described in U.S. patent application Ser. No. 11/691,339. This step ensures that the true foreground pixels have colors consistent with the neighboring true background pixels so that later compression processing on the background image layer achieves optimal performance. If a pixel is a dilated foreground pixel, its distance to the closest true background pixel is measured (step 715). If this distance is greater than a threshold value, the pixel retains its foreground color since it may be assumed to be part of the true foreground (step 725). However, if this distance is within a threshold value, the pixel color is either assigned the color of the nearest true background pixel or, if the pixel is determined to be on an edge, it is assigned a color that is the average of the colors of the neighboring pixels on the edge. It should be noted that color assignment methods are not critical to the invention and other color assignment methods should be obvious to one skilled in the art. In alternative embodiments, method 700 may be applied to grayscale images.

Figure 8:
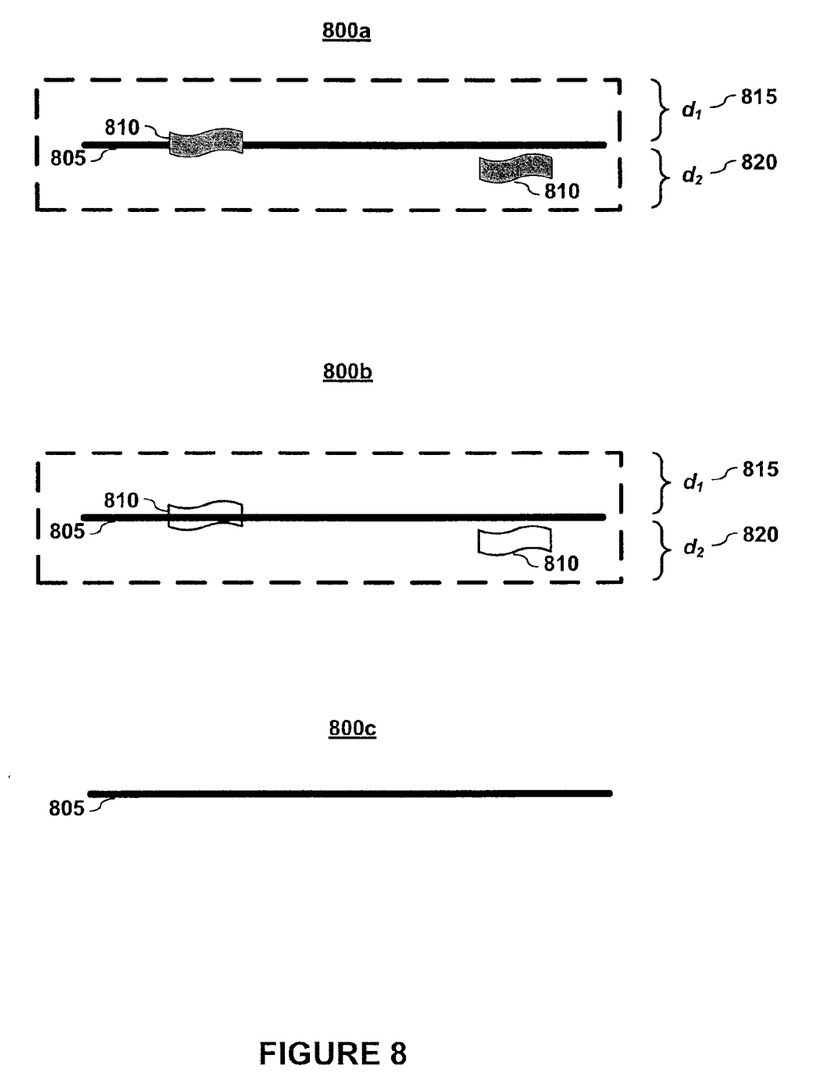
FIG. 8 illustrates an example of applying pixel dilation to an edge in an image in order to mitigate artifacts according to various embodiments of the invention.

FIG. 8 depicts an illustration of an embodiment of method 700 along an edge 805 with unlabeled pixels 810 in an output background layer 800. In illustration 800a, the originally unlabeled pixels 810 were identified as dilated foreground pixels from the dilated foreground mask which enhanced the edge boundary by a distance $(d_1+d_2)$ (815+820). The distance $(d_1+d_2)$ was determined according to an embodiment of step 605 in method 600, as previously discussed. In illustration 800b, the colors of the dilated foreground pixels 810 were adjusted to transition with their neighboring pixels as described according to an embodiment of method 700. In illustration 800c, the colors of the pixels in the output background layer have been adjusted prior to compression.

It shall be noted that the present invention may be implemented in any computing device or system capable of processing the image data, including without limitation, a general-purpose computer and a specific computer, such as one intended for graphics processing. The present invention may also be implemented into other computing devices and systems, including without limitation, a digital camera, a printer, a scanner, a printer, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 9:
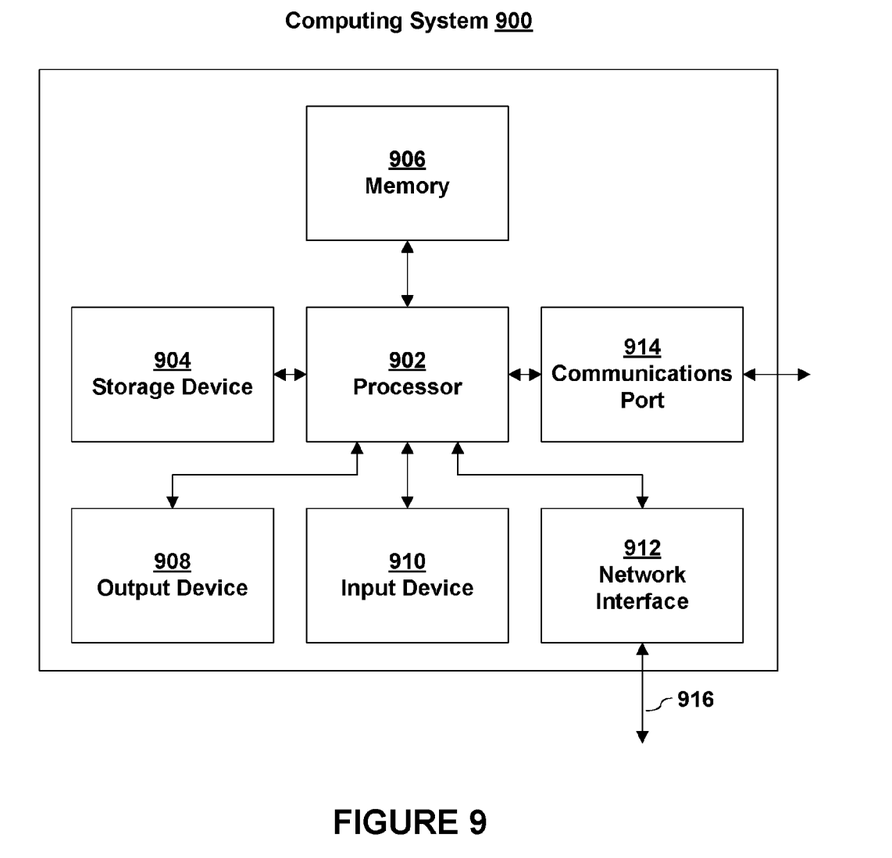
FIG. 9 depicts a functional block diagram of an embodiment of a computing device that may implement or embody an embodiment of the present invention.

FIG. 9 depicts a functional block diagram of an embodiment of a computing device 900 that may implement or embody an embodiment of the present invention. As illustrated in FIG. 9, a processor 902 executes software instructions and interacts with other system components. In an embodiment, processor 902 may be a general purpose processor such as an AMD processor, an INTEL x86 processor, a SUN MICROSYSTEMS SPARC, or a POWERPC compatible-CPU, or the processor may be an application specific processor or processors. A storage device 904, coupled to processor 902, provides long-term storage of data and software programs. Storage device 904 may be a hard disk drive and/or another device capable of storing data, such as a computer-readable media (e.g., diskettes, tapes, compact disk, DVD, and the like) drive or a solid-state memory device. Storage device 904 may hold programs, instructions, and/or data for use with processor 902. In an embodiment, programs or instructions stored on or loaded from storage device 904 may be loaded into memory 906 and executed by processor 902. In an embodiment, storage device 904 holds programs or instructions for implementing an operating system on processor 902. In one embodiment, possible operating systems include, but are not limited to, UNIX, AIX, LINUX, Microsoft Windows, and the Apple MAC OS. The operating system executes on, and controls the operation of, the computing system 900.

An addressable memory 906, coupled to processor 902, may be used to store data and software instructions to be executed by processor 902. Memory 906 may be, for example, firmware, read only memory (ROM), flash memory, non-volatile random access memory (NVRAM), random access memory (RAM), or any combination thereof. In one embodiment, memory 906 stores a number of software objects, otherwise known as services, utilities, or modules. One skilled in the art will also recognize that storage 904 and memory 906 may be the same items and function in both capacities. In an embodiment, one or more of the components of FIG. 1 may be modules stored in memory 904, 906 and executed by processor 902.

In an embodiment, computing system 900 provides the ability to communicate with other devices, other networks, or both. Computing system 900 may include one or more network interfaces or adapters 912, 914 to communicatively couple computing system 900 to other networks and devices. For example, computing system 900 may include a network interface 912, a communications port 914, or both, each of which are communicatively coupled to processor 902, and which may be used to couple computing system 900 to other computer systems, networks, and devices.

In an embodiment, computing system 900 may include one or more output devices 908, coupled to processor 902, to facilitate displaying graphics and text. Output devices 908 may include, but are not limited to, a display, LCD screen, CRT monitor, printer, touch screen, or other device for displaying information. Computing system 900 may also include a graphics adapter (not shown) to assist in displaying information or images on output device 908.

One or more input devices 910, coupled to processor 902, may be used to facilitate user input. Input device 910 may include, but are not limited to, a pointing device, such as a mouse, trackball, or touchpad, and may also include a keyboard or keypad to input data or instructions into computing system 900.

In an embodiment, computing system 900 may receive input, whether through communications port 914, network interface 916, stored data in memory 904/906, or through an input device 910, from a scanner, copier, facsimile machine, or other computing device.

One skilled in the art will recognize no computing system is critical to the practice of the present invention. One skilled in the art will also recognize that a number of the elements described above may be physical and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method of compressing a multi-layer digital image, the method comprising the following steps:
   providing a processor to implement the following steps:
   (a) accessing a digital image;
   (b) creating said multi-layer digital image by separating said digital image into a plurality of layers including a foreground layer and a background layer, said foreground layer including the pixels comprising text or sharp lines within said digital image;
   (c) constructing a foreground mask from said foreground layer;
   (d) dilating said foreground mask to create a dilated-foreground mask;
   (e) applying said dilated-foreground mask to said background layer, wherein all background layer pixels defined within said dilated-foreground mask are deemed transition pixels, and all background layer pixels not defined within said dilated-foreground mask are deemed true-background pixels;
   (f) modifying said background layer by conditionally changing the pixel colors of select transition pixels to colors determined by the colors of their nearest true-background pixels;
   (g) individually compressing said foreground layer, said foreground mask and the modified background layer.

2. The method of claim 1, wherein in step (g), the pixels comprising the modified background layer are determined by means of the non-dilated foreground mask.

3. The method of claim 1, wherein step (f) includes:
   for each transition pixel:
   IF the distance from a transition pixel to its nearest true-background pixels is not greater than a predefined threshold,
   THEN changing the color of the transition pixel to the average of its neighboring true-background pixels;
   ELSE leaving the color of the transition pixel unchanged.

4. The method of claim 1, wherein in step (c), the foreground mask is defined by the pixels comprising said foreground layer.

5. The method of claim 1, further including after step (g):
   (h) combining the compressed foreground layer and the compressed modified background layer according to the compressed foreground mask.

6. The method of claim 1, wherein said foreground layer is compressed using a first compression technique, and said modified background layer is compressed using a second compression technique.

7. The method of claim 6, wherein said second compression technique provides greater compression than said first compression technique.

8. The method of claim 1, wherein said multi-layer digital image has two-layers, and said background layer contains all pixels not within said foreground layer.

9. The method of claim 8, wherein said multi-layer digital image is a portable document format (PDF) image.

10. The method of claim 1, wherein in step (d), the foreground mask is dilated by a morphological operation that expands the foreground area to neighboring pixels defined as being part of the background layer by the non-dilated foreground mask.

11. The method of claim 1, wherein said foreground mask is a binary mask.

12. A non-transitory computer readable medium having instructions for performing the method of claim 1.

13. A computing system for creating a compressed digital image, comprising:
   a processor for executing the following steps:
   (a) accessing a digital image;
   (b) creating a multi-layer digital image by separating said digital image into a plurality of layers including a foreground layer and a background layer, said foreground layer including the pixels that comprise text or sharp lines within said digital image;
   (c) constructing a foreground mask from said foreground layer;
   (d) dilating said foreground mask to create a dilated-foreground mask;
   (e) applying said dilated-foreground mask to said background layer, wherein all background layer pixels defined within said dilated-foreground mask are deemed transition pixels, and all background layer pixels not defined within said dilated-foreground mask are deemed true-background pixels;
   (f) modifying said background layer by conditionally changing the pixel colors of select transition pixels to colors determined by the colors of their nearest true-background pixels;
   (g) individually compressing said foreground layer, said foreground mask and the modified background layer.

14. The system of claim 13, wherein in step (g), the pixels comprising the modified background layer are determined by means of the non-dilated, foreground mask.

15. The system of claim 13, wherein step (f) includes:
   for each transition pixel:
   IF the distance from a transition pixel to its nearest true-background pixels is not greater than a predefined threshold,
   THEN changing the color of the transition pixel to the average of its neighboring true-background pixels;
   ELSE leaving the color of the transition pixel unchanged.

16. The system of claim 13, further including after step (g):
   (h) combining the compressed foreground layer and the compressed modified background layer according to the compressed foreground mask.

17. The system of claim 13, wherein said foreground layer is compressed using a first compression technique, and said modified background layer is compressed using a second compression technique.

18. The system of claim 17, wherein said second compression technique provides greater compression than said first compression technique.

19. The system of claim 13, wherein said multi-layer digital image has two-layers, said background layer contains all pixels not within said foreground layer, and said multi-layer digital image is a portable document format (PDF) image.

20. The system of claim 13, wherein said foreground mask is a binary mask.

* * * * *